US012675785B2

(12) United States Patent
Kawata et al.

(10) Patent No.: US 12,675,785 B2
(45) Date of Patent: Jul. 7, 2026

(54) SALES DATA PROCESSING APPARATUS

(71) Applicant: Toshiba Tec Kabushiki Kaisha, Tokyo (JP)

(72) Inventors: Kento Kawata, Chigasaki Kanagawa (JP); Yasuhiro Ono, Yokohama Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/745,996

(22) Filed: Jun. 17, 2024

(65) Prior Publication Data

US 2025/0094954 A1 Mar. 20, 2025

(30) Foreign Application Priority Data

Sep. 14, 2023 (JP) ................................. 2023-149644

(51) Int. Cl.
 *G06Q 20/20* (2012.01)
(52) U.S. Cl.
 CPC .................................. *G06Q 20/208* (2013.01)
(58) Field of Classification Search
 CPC ...... G06Q 20/208; G06Q 20/20; G06Q 20/18; A47F 9/04; A47F 9/047; G07G 1/0072; G07G 1/0018; G07G 1/01; G07G 1/12; G07G 1/0081; B65B 67/12
 See application file for complete search history.

(56) References Cited

U.S. PATENT DOCUMENTS

| | | | |
|---|---|---|---|
| 6,206,285 | B1 | 3/2001 | Baitz et al. |
| 2009/0114730 | A1* | 5/2009 | Tashiro ................ G07G 1/0018 |
| | | | 235/7 A |
| 2011/0192900 | A1* | 8/2011 | Terahara ............. G07G 1/0018 |
| | | | 235/383 |
| 2021/0264400 | A1* | 8/2021 | Kubota ................ G06Q 20/208 |
| 2022/0076544 | A1* | 3/2022 | Kawaguchi .......... G07G 1/0045 |
| 2022/0277283 | A1* | 9/2022 | Yajima ................. G06Q 20/208 |
| 2022/0277309 | A1* | 9/2022 | Yajima .................. G06V 20/52 |
| 2023/0032651 | A1 | 2/2023 | Kawaguchi et al. |
| 2023/0237456 | A1 | 7/2023 | Kawaguchi |

(Continued)

FOREIGN PATENT DOCUMENTS

| | | | | |
|---|---|---|---|---|
| CN | 204680118 | U | * 9/2015 | |
| CN | 110298985 | A | * 10/2019 | ............... G07G 1/12 |
| CN | 112002086 | A | * 11/2020 | ........... G06V 40/166 |

(Continued)

OTHER PUBLICATIONS

Office Action mailed Jul. 29, 2025 in corresponding Korean Patent Application No. 2024-0070548, 11 pages (with Translation).

(Continued)

*Primary Examiner* — A. Hunter Wilder
(74) *Attorney, Agent, or Firm* — Kim & Stewart LLP

(57) ABSTRACT

A sales data processing apparatus includes a first table on which an item is placeable, a mounting table including a mounting plate and columnar supports disposed on sides of the first table to face each other, the mounting plate being supported by the supports and disposed above the first table, and a first display device that is disposed on the mounting plate and includes a display surface facing a first direction.

19 Claims, 17 Drawing Sheets

(56)                    References Cited

U.S. PATENT DOCUMENTS

2024/0331510 A1 * 10/2024 Miyashima ............ G06Q 20/18

FOREIGN PATENT DOCUMENTS

| | | | | |
|---|---|---|---|---|
| CN | 114093099 | A | | 2/2022 |
| JP | 2011-164761 | A | | 8/2011 |
| JP | 2021051444 | A | * | 4/2021 |
| JP | 2021-086330 | A | | 6/2021 |
| JP | 2021-128383 | A | | 9/2021 |
| JP | 2022-167156 | A | | 11/2022 |
| JP | 2023019575 | A | * | 2/2023 |
| JP | 2023-107429 | A | | 8/2023 |
| KR | 2022-0153629 | A | | 11/2022 |

OTHER PUBLICATIONS

Extended European Search Report mailed Dec. 19, 2024 in corresponding European Patent Application No. 24189148.0, 8 pages.
Japanese Office Action dated Feb. 3, 2026, mailed in counterpart Japanese Application No. 2023-149644, 6 pages (with translation).

* cited by examiner

SALES DATA PROCESSING APPARATUS

CROSS-REFERENCE TO RELATED APPLICATION(S)

This application is based upon and claims the benefit of priority from Japanese Patent Application No. 2023-149644, filed Sep. 14, 2023, the entire contents of which are incorporated herein by reference.

FIELD

Embodiments described herein relate generally to a sales data processing apparatus.

BACKGROUND

A known self-service POS (Point-of-Sale) terminal enables a customer in a retail store, such as a supermarket, to perform an item registration process for registering an item and a payment process for making a payment for the item registered in the item registration process. Installing such a self-service POS terminal eliminates the need for a retail store to have an employee who operates a POS terminal and thereby makes it possible to save labor.

However, because a customer is less familiar with the operation of a POS terminal compared with a store clerk, it takes a lot of time for the customer to perform necessary processes. Therefore, it is required to install more self-service POS terminals in a limited installation area in a retail store.

SUMMARY OF THE INVENTION

Embodiments of the present invention provide a space-saving sales data processing apparatus.

An aspect of this disclosure provides a sales data processing apparatus comprising a first table on which an item is placeable; a mounting table including a mounting plate and columnar supports disposed on sides of the first table to face each other, the mounting plate being supported by the supports and disposed above the first table; and a first display device that is disposed on the mounting plate and includes a display surface facing a first direction.

DETAILED DESCRIPTION

Hereinafter, embodiments will be described in detail with reference to the drawings. The present invention is not limited to the embodiments described below.

Figure 1:
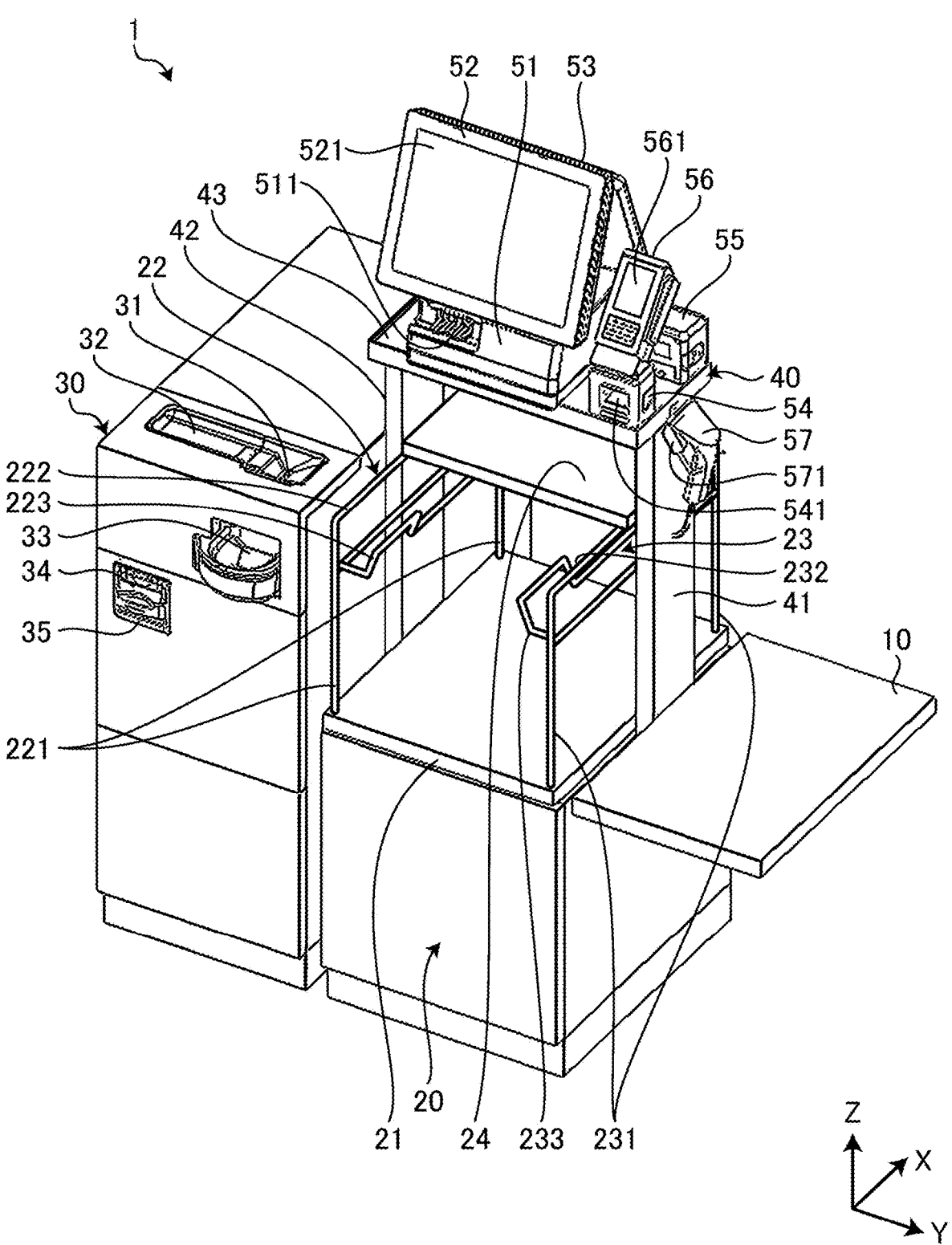
FIG. 1 is an external perspective view of a POS terminal according to an embodiment.
Figure 2:
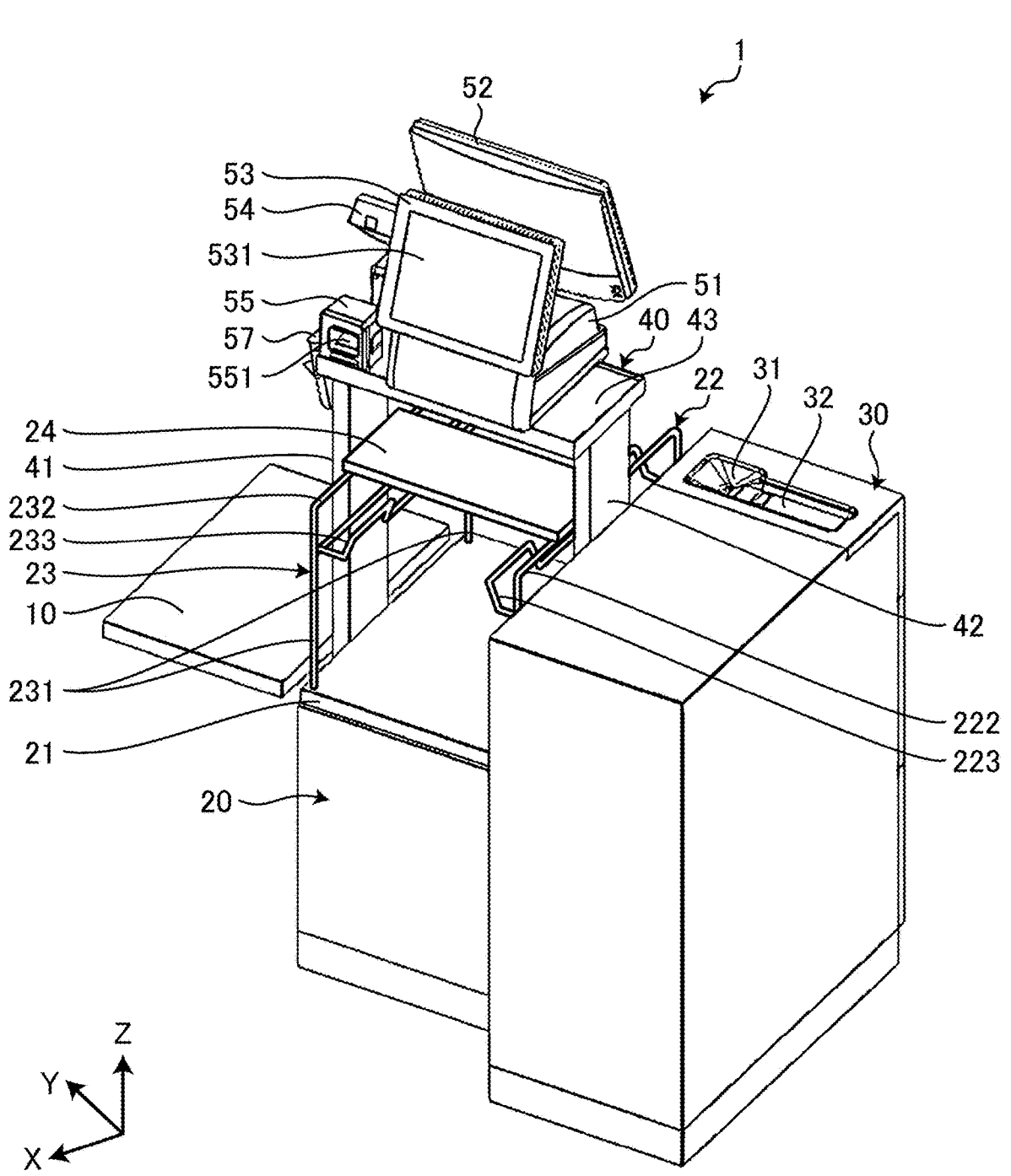
FIG. 2 is an external perspective view of the POS terminal according to the embodiment.

FIG. 1 is an external perspective view of a POS terminal 1 according to the present embodiment. FIG. 2 is another external perspective view of the POS terminal 1. The POS terminal 1 is operated by a customer to perform, for example, an item registration process for registering an item and a payment process for making a payment for the item registered in the item registration process.

With the POS terminal 1, the item registration process and the payment process can be performed solely by the customer. Therefore, a store does not need to have a store clerk for this purpose and can save labor. However, since the customer is less familiar with the operation of the POS terminal 1 compared with a store clerk, it takes a lot of time for the customer to perform the processes. Consequently, the installation area in which the POS terminal 1 is installed may become congested.

Therefore, it is required to install more POS terminals 1 in the installation area. Furthermore, there is a demand for a POS terminal 1 that enables the store clerk to easily assist the customer.

The POS terminal 1 is configured such that the customer and the store clerk face each other. The customer and the store clerk operate the POS terminal 1 placed between them. FIG. 1 is a perspective view of the POS terminal 1 as viewed from the customer. FIG. 2 is a perspective view of the POS terminal 1 as viewed from the store clerk.

The POS terminal 1 includes a basket table 10, a packing table 20, an automatic change machine 30, and a mounting table 40. In the present embodiment, the vertical direction is referred to as a Z-axis direction, the direction in which the basket table 10, the packing table 20, and the automatic change machine 30 are arranged is referred to as a Y-axis direction, and the direction orthogonal to the Z-axis direction and the Y-axis direction is referred to as an X-axis direction. In other words, the direction in which the customer and the store clerk face each other is referred to as the X-axis direction.

The basket table 10 is a table on which a basket containing items collected by the customer is placed. The basket table 10 is disposed on the right side of the packing table 20 when viewed from the customer side. The basket table 10 may instead be disposed on the left side of the packing table 20 when viewed from the customer side. That is, the basket table 10 may be disposed on either side of the packing table 20. The basket table 10 is an example of a side table.

The automatic change machine 30 receives money and gives change. The automatic change machine 30 is disposed on the side opposite to the basket table 10 with respect to the packing table 20. In other words, the basket table 10 and the automatic change machine 30 are arranged to face each other across the packing table 20. For example, the automatic change machine 30 is disposed on the left side of the packing table 20 when viewed from the customer side. The automatic change machine 30 includes a coin insertion port 31 and a money placing part 32 on its upper surface.

The money placing part 32 is a flat area on which money, such as coins, is placed. Also, the money placing part 32 is an area recessed from other areas of the upper surface excluding the coin insertion port 31. Being recessed, the money placing part 32 can hold money.

The coin insertion port 31 is a slot into which coins are inserted. The money placing part 32 and the coin insertion port 31 are formed on a substantially flat surface. Selected coins are inserted into the coin insertion port 31 by sliding the money placing part 32.

The automatic change machine 30 includes a coin dispensing port 33, a bill insertion port 34, and a bill dispensing port 35 on a side surface facing the customer. The coin dispensing port 33 dispenses coins as, for example, change. The bill insertion port 34 is an insertion slot into which bills are inserted. The bill dispensing port 35 dispenses bills as, for example, change.

The packing table 20 is a table on which items read by a first reading unit 54, a second reading unit 55, or a handy scanner 57 are placed. In other words, the packing table 20 is a table on which items to be sold are placed. The packing table 20 is an example of a first table. For example, the packing table 20 is used to put items in a bag. The packing table 20 is disposed substantially in the center of the POS terminal 1.

The packing table 20 includes a flat top plate 21 on the upper side. The packing table 20 includes a weight scale for measuring the weight of an object placed on the top plate 21. For example, the weight scale is implemented by a load cell. In the item registration process, the POS terminal 1 (or a processor of a main body 51 described later) compares the weight of an item registered in an item master with the weight of the item measured by the weight scale. The POS terminal 1 determines whether an item registered in the item registration process is placed on the packing table 20. When the weight of the item registered in the item master does not match the weight of the item measured by the weight scale, the POS terminal 1 stops the item registration process to prevent fraud. The packing table 20 does not necessarily include the weight scale, and the weight scale may be omitted.

A first bag hanger 22 and a second bag hanger 23 are disposed on the top plate 21.

The first bag hanger 22 is used to hang a bag containing items. The first bag hanger 22 includes a pair of vertical bars 221, a horizontal bar 222, and a hook 223. The vertical bars 221 extend substantially perpendicularly from the top plate 21. The vertical bars 221 are disposed in a corner of the top plate 21 formed by the sides facing the automatic change machine 30 and the customer and a corner of the top plate 21 formed by the sides facing the automatic change machine 30 and the store clerk. That is, the vertical bars 221 are disposed in corners of the top plate 21 and arranged in a first direction. The first direction is parallel to the X-axis direction and is a direction to face the customer side. The vertical bars 221 are attached to the top plate 21 with, for example, screws. The horizontal bar 222 is supported by the vertical bars 221 and disposed substantially parallel to the X-axis direction. The hook 223 is supported by the vertical bars 221 and used to hang a bag. More specifically, the hook 223 is a rod-shaped member that extends toward the center of the packing table 20 and then bends upward. A bag can be hung on the bent portion of the hook 223.

The second bag hanger 23 is used to hang a bag containing items. The second bag hanger 23 includes a pair of vertical bars 231, a horizontal bar 232, and a hook 233. The vertical bars 231 extend substantially perpendicularly from the top plate 21. The vertical bars 231 are disposed in a corner of the top plate 21 formed by the sides facing the basket table 10 and the customer and a corner of the top plate 21 formed by the sides facing the basket table 10 and the store clerk. That is, the vertical bars 231 are disposed in corners of the top plate 21 that are arranged in the first direction. The vertical bars 231 are attached to the top plate 21 with, for example, screws. The horizontal bar 232 is supported by the vertical bars 231 and disposed substantially parallel to the X-axis direction. The hook 233 is supported by the vertical bars 231 and used to hang a bag. More specifically, the hook 233 is a rod-shaped member that extends toward the center of the packing table 20 and then bends upward. A bag can be hung on the bent portion of the hook 233.

Not only a bag but also a shopping basket of the customer may be placed on the top plate 21 of the packing table 20. A space in which a shopping basket can be placed is provided between the first bag hanger 22 and the second bag hanger 23. More specifically, the distance between the vertical bars 221 and the vertical bars 231 in the width direction is wider than the width of a general shopping basket. Furthermore, the hooks 223 and 233 are disposed in positions higher than the height of a shopping basket. Therefore, the customer can place not only a bag but also a shopping basket on the top plate 21 and place items in the shopping basket.

The first bag hanger 22 and the second bag hanger 23 are arranged such that the horizontal bars 222 and 232 are disposed parallel to each other.

Furthermore, the horizontal bar 222 of the first bag hanger 22 and the horizontal bar 232 of the second bag hanger 23 support a temporary table 24. The temporary table 24 is supported by the first bag hanger 22 and the second bag hanger 23 and is used to temporarily place items. The temporary table 24 is an example of a second table. The temporary table 24 is a flat plate. Here, the first bag hanger 22 and the second bag hanger 23 are attached to the top plate 21. Therefore, the weight scale included in the packing table 20 also measures the weight of items placed on the temporary table 24.

The mounting table 40 includes a first support 41, a second support 42, and a mounting plate 43. The first support 41 and the second support 42 are columnar members that support the mounting plate 43. The first support 41 and the second support 42 are examples of supports.

More specifically, the first support 41 and the second support 42 are disposed on the sides of the packing table 20 to face each other in a direction orthogonal to the first direction. The first support 41 is a plate-shaped column disposed between the basket table 10 and the packing table 20. Furthermore, the first support 41 may be fixed to the basket table 10, may be fixed to the packing table 20, may be fixed to the ground, or may be fixed to a combination of them.

The second support 42 is a plate-shaped column disposed between the automatic change machine 30 and the packing table 20. Furthermore, the second support 42 may be fixed to the basket table 10, may be fixed to the packing table 20, may be fixed to the ground, or may be fixed to a combination of them.

A main body 51, a first display unit 52, a second display unit 53, a first reading unit 54, and a second reading unit 55 are disposed on the mounting plate 43 of the mounting table 40. The first display unit 52, the second display unit 53, the first reading unit 54, and the second reading unit 55 are examples of a first display device, a second display device, a first reading device, and a second reading device, respectively.

The main body 51 is a main unit of the POS terminal 1. For example, the main body 51 includes a control unit, such as a processor, that controls the POS terminal 1 and is disposed inside of a housing. The main body 51 includes a printer (not shown) inside of the housing. The printer prints a receipt indicating items that are registered in the POS terminal 1 and purchased. Then, the printer discharges the receipt through a receipt discharge port 511 facing the first direction.

The first display unit 52 is a touch panel display that displays images related to an item registration process for registering items read by the first reading unit 54, the second reading unit 55, or the handy scanner 57 and a payment process for payment of the items registered in the item registration process. The first display unit 52 includes a first display surface 521 that displays images for the customer and receives various operations. The first display surface 521 faces the first direction, that is, faces the customer.

The second display unit 53 is a touch panel display that displays images related to the item registration process for registering items read by the first reading unit 54, the second reading unit 55, or the handy scanner 57 and the payment process for payment of the items registered in the item registration process. The second display unit 53 includes a second display surface 531 that displays images for the store clerk and receives various operations. The second display surface 531 faces a second direction, that is, faces the store clerk. In other words, the second display surface 531 faces the second direction that is the opposite of the first direction in which the first display surface 521 of the first display unit 52 is oriented.

The first reading unit 54 is a scanner that reads item information for identifying an item. The first reading unit 54 includes a first reading window 541 facing the first direction. With this configuration, the first reading unit 54 forms a reading area for reading item information in the first direction. That is, the first reading unit 54 reads item information by capturing an image of an item held over the first reading window 541. The first reading unit 54 may be a scanner that reads item information by irradiating an item held over the first reading window 541 with a laser beam.

The second reading unit 55 is a scanner that reads item information for identifying an item. The second reading unit 55 includes a second reading window 551 facing the second direction. With this configuration, the second reading unit 55 forms a reading area for reading item information in the second direction. That is, the second reading unit 55 reads item information by capturing an image of an item held over the second reading window 551. The second reading unit 55 may be a scanner that reads item information by irradiating an item held over the second reading window 551 with a laser beam or the like.

A payment terminal 56 is placed on the upper surface of the first reading unit 54. In the payment process, the payment terminal 56 is used to make a payment for an item with a credit card or electronic money. The payment terminal 56 includes an operation surface 561 facing the first direction. The operation surface 561 includes numeric keys and a display. The customer makes a payment by operating the operation surface 561.

Furthermore, a holder 571 is provided on a side surface of the mounting plate 43 adjacent to the first support 41. The holder 571 holds the handy scanner 57 that is held and used by the customer or the store clerk. The customer or the store clerk touches an item with the handy scanner 57 to read its item information. The handy scanner 57 is held by the holder 571 provided on a side surface of the mounting plate 43 adjacent to the first support 41. In other words, the handy scanner 57 is disposed on one side of the mounting table 40 in a direction orthogonal to the first direction. The handy scanner 57 can be used or is accessible from both of the store clerk side and the customer side, that is, from both sides in the first direction.

With the above configuration of the POS terminal 1, the customer stands at a position facing the first display surface 521 of the first display unit 52. The customer causes the first reading unit 54 to read item information for identifying an item placed in a basket on the basket table 10. Alternatively, when an item is heavy and it is difficult for the customer to lift the item to the height of the first reading unit 54, the customer uses the handy scanner 57 to read item information.

The customer places the item, the item information of which has been read, in a bag hung on the first bag hanger 22 or the second bag hanger 23. In other words, the customer places the item on the top plate 21 of the packing table 20. When the item is a fragile item, such as bread or an egg, the customer temporarily places the item on the temporary table 24. Then, at the final stage of the packing, the customer puts the item placed on the temporary table 24 in the bag. This enables the customer to prevent a fragile item from being crushed by other items.

When the item information is read by the first reading unit 54 or the handy scanner 57, the POS terminal 1 acquires various kinds of information from the item master containing information related to items. For example, the POS terminal 1 acquires, from the item master, information such as an item name, a unit price, and a weight. Then, the POS terminal 1 displays, on the first display unit 52, the item name and the unit price of the item identified by the read item information. With the displayed information, the customer can confirm whether the item read by the first reading unit 54 or the handy scanner 57 matches the item identified by the POS terminal 1.

Furthermore, the POS terminal 1 measures the weight of the item placed on the top plate 21 or the temporary table 24. The POS terminal 1 determines whether a difference between the weight of the item identified based on the read item information and the weight of the item measured by the weight scale of the packing table 20 is within a set error range. When the difference in weight is outside of the error range, the POS terminal 1 notifies that the item has not been registered normally because the measured weight differs from the identified weight. For example, the POS terminal 1 displays a notification on the first display unit 52 or the second display unit 53, sends a notification to a terminal used by the store clerk, provides an audio notification by using a speaker built in the POS terminal 1, or gives a notification using an indicator lamp. Then, the POS terminal 1 suspends the item registration process. With this configuration, the POS terminal 1 can prevent fraud.

For example, the POS terminal 1 stops the item registration process and disables the subsequent registration of items. For example, when an item the item information of which has not been read is put in a bag, the POS terminal 1 enters an item registration disabled state in which the item registration is disabled. Then, the POS terminal 1 returns to an item registration enabled state in which the item registration is enabled when the corresponding item is removed from the packing table 20. For example, when an item having a weight different from the read item information is placed in a bag, the POS terminal 1 enters the item registration disabled state. Then, the POS terminal 1 returns to the item registration enabled state when the corresponding item is removed from the packing table 20 and an item having the same weight as the read item information is placed in the bag. Also, the POS terminal 1 may display, on the first display unit 52 or the second display unit 53, a method for restoring the POS terminal 1 to the item registration enabled state.

When the item registration is completed, the customer operates the first display unit 52 to indicate that the item registration has been completed. When receiving the operation indicating that the item registration has been completed, the POS terminal 1 displays an image prompting the customer to perform a payment process for the items registered in the item registration process. For example, the first display unit 52 displays an image that prompts the customer to put cash in the automatic change machine 30 when making a payment with cash. In addition, the first display unit 52 displays an image that prompts the customer to input information on a credit card or electronic money to the payment terminal 56 when making a payment with the credit card or the electronic money.

The automatic change machine 30 calculates change when cash is inserted from the coin insertion port 31 or the bill insertion port 34. Then, when there is change, the automatic change machine 30 dispenses the change from the coin dispensing port 33 or the bill dispensing port 35. The payment terminal 56 executes the payment process when information related to the payment process is input. In this way, the POS terminal 1 executes the item registration process and the payment process.

However, since the customer is less familiar with the operation of the POS terminal 1 compared with the store clerk, it takes time for the customer to perform the item registration process and the payment process. For example, when the customer is unfamiliar with the operation of the POS terminal 1, when the number of items to be sold is large, or when there are many items without bar codes indicating item information, it takes time for the customer to perform the item registration process.

Therefore, each customer needs to stay for a long time in the installation area in which the POS terminal 1 is installed, and the installation area is congested with customers. Therefore, there is a demand for an apparatus that enables the store clerk to easily assist a customer taking a long time to perform the item registration process or the like.

The store clerk stands at a position facing the second display surface 531 of the second display unit 53. That is, the customer and the store clerk face each other across the POS terminal 1. Then, the store clerk performs the item registration process together with the customer.

Here, the POS terminal 1 includes the second display unit 53 and the second reading unit 55 that face the first display unit 52 and the first reading unit 54. That is, the POS terminal 1 includes the second display unit 53 and the second reading unit 55 facing the store clerk. The second display unit 53 and the second reading unit 55 are disposed on the mounting table 40. Furthermore, the POS terminal 1 includes the handy scanner 57 that is disposed on the side surface of the mounting plate 43 adjacent to the first support 41 and can be picked up from both of the customer side and the store clerk side. That is, the handy scanner 57 is shared by the customer and the store clerk.

Furthermore, the POS terminal 1 includes the packing table 20 that is disposed below the mounting table 40 and usable for packing from both of the customer side and the store clerk side. Furthermore, the POS terminal 1 includes the temporary table 24 that is supported by the first bag hanger 22 and the second bag hanger 23 and on which items can be placed from both of the customer side and the store clerk side.

As described above, the POS terminal 1 includes the second display unit 53 and the second reading unit 55 facing the store clerk. Therefore, the store clerk can perform the item registration together with the customer. Furthermore, there is no object preventing the packing by the store clerk between the top plate 21 of the packing table 20 and the mounting plate 43. In other words, between the top plate 21 of the packing table 20 and the mounting plate 43 of the mounting table 40, a space accessible from both of the customer side and the store clerk side is formed. Therefore, the store clerk can carry out packing of items together with the customer.

With the above configuration of the POS terminal 1, compared with the configuration of a related-art apparatus in which the store clerk and the customer stand on the same side, share one display unit and one reading unit, and place items in a bag together, the store clerk can more easily assist the customer.

When the customer and the store clerk face each other to perform the item registration process, the POS terminal 1 may be configured to switch from a self-service mode in which the customer independently performs the item registration process and the payment process to a face-to-face mode in which the customer and the store clerk face each other to perform the item registration process together and the customer performs the payment process. For example, the POS terminal 1 may be configured to switch modes upon receiving a switching operation via an image displayed on the second display surface 531 of the second display unit 53. Alternatively, in the POS terminal 1, the second reading window 551 of the second reading unit 55 may be covered to prevent unintended reading of item information. In this case, the second reading window 551 of the second reading unit 55 is operable. However, by physically covering the second reading window 551 of the second reading unit 55, unintended reading of item information is prevented. In the face-to-face mode, the customer and the store clerk perform the item registration process, and the customer independently performs the payment process for registered items by using the automatic change machine 30 ’for cash payment or using the payment terminal 56 for payment with a credit card or electronic money.

Furthermore, the POS terminal 1 according to the present embodiment includes the packing table 20 on which items to be sold are placed. In addition, the POS terminal 1 includes the first support 41 and the second support 42 having a columnar shape and disposed on the sides of the packing table 20 to face each other in a direction orthogonal to the first direction. Furthermore, the POS terminal 1 includes the mounting table 40 including the mounting plate 43 that is supported by the first support 41 and the second support 42 and disposed above the packing table 20. The POS terminal 1 includes the first display unit 52 disposed on the mounting plate 43 and having the first display surface 521 facing the first direction.

As described above, since the POS terminal 1 has the first display unit 52 disposed above the packing table 20, there is no need to secure a space for the first display unit 52. Therefore, the POS terminal 1 can achieve space-saving. That is, the POS terminal 1 can reduce congestion in the installation area.

First Variation

Figure 3:
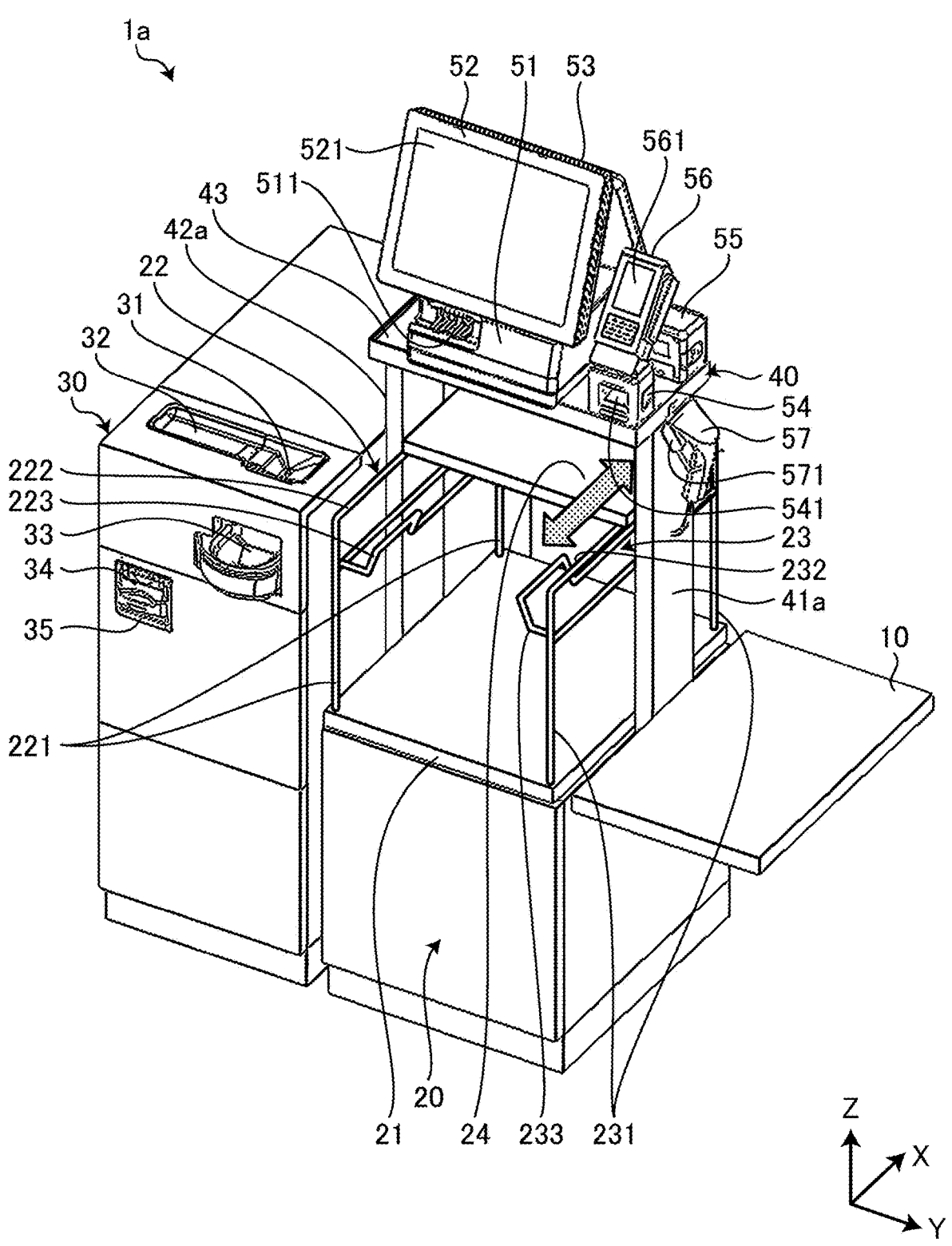
FIG. 3 is an external perspective view of a POS terminal according to a first variation.
Figure 4A:
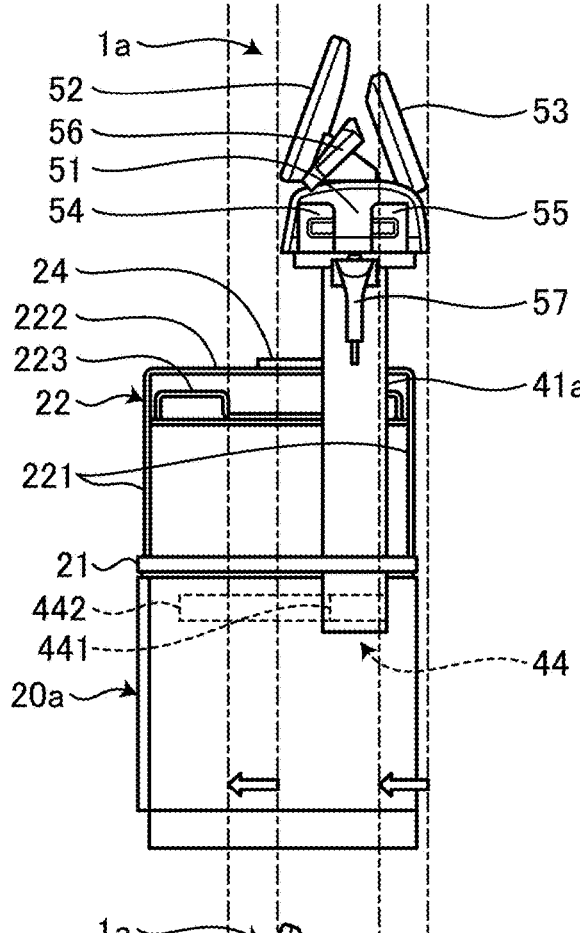
FIGS. 4A and 4B are external side views of the POS terminal according to the first variation.
Figure 4B:
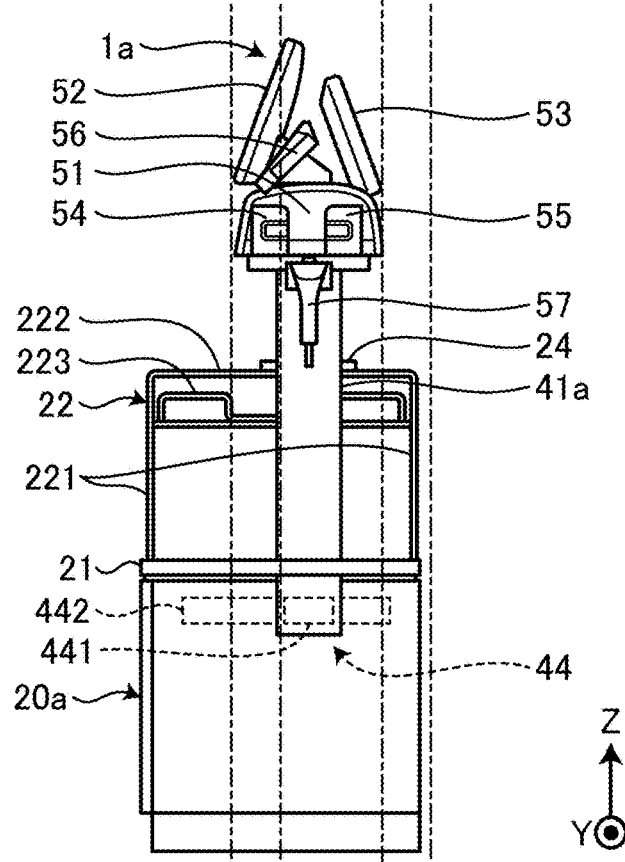

A POS terminal 1*a* according to a first variation includes a mounting table 40 that is movable in the X-axis direction. FIG. 3 is an external perspective view of the POS terminal 1*a* according to the first variation. FIGS. 4A and 4B are external side views of the POS terminal 1*a* according to the first variation. FIG. 4A illustrates a state in which the mounting table 40 is positioned closest to the store clerk side. FIG. 4B illustrates a state in which the mounting table 40 is moved to the customer side.

Here, it is preferable for the store clerk to hold an item over the second reading unit 55 with his/her arm extended, that is, without bending his/her arm in the X-axis direction.

When the second reading unit 55 is positioned as illustrated in FIG. 4A, the store clerk bends his/her arm to move an item in his/her hand toward him/herself. Next, the store clerk holds the item over the second reading unit 55 with his/her arm bent. The second reading unit 55 reads item information for identifying the item. Then, after the item information is read by the second reading unit 55, the store clerk stretches his/her arm to place the item on the packing table 20. As described above, when the distance between the second reading unit 55 and the store clerk is short, the store clerk needs to bend his/her arm every time to read an item.

When the second reading unit 55 is positioned as illustrated in FIG. 4B, since the distance to the second reading unit 55 is longer than that in FIG. 4A, the store clerk can reduce the amount of bending his/her arm. That is, the store clerk can hold an item over the second reading unit 55 without bending his/her arm too much. Furthermore, since the store clerk does not have to bend the arm, the store clerk can place the item on the packing table 20 without stretching his/her arm.

For the above reason, the POS terminal 1*a* includes the mounting table 40 that is movable in the X-axis direction. Specifically, the POS terminal 1*a* includes a first moving mechanism 44 between a first support 41*a* and the packing table 20 and a second moving mechanism (not shown) between a second support 42*a* and the packing table 20.

For example, each of the first moving mechanism 44 and the second moving mechanism (not shown) is implemented by a slide rail. More specifically, the first moving mechanism 44 includes a first packing table rail 442 on the first support 41*a* and a first support rail 441 on the packing table 20. Similarly, the second moving unit (not shown) includes a second packing table rail (not shown) on the second support 42*a* and a second support rail (not shown) on the packing table 20.

The first packing table rail 442 and the first support rail 441 are connected to each other, and one or more balls for reducing friction are disposed between the first packing table rail 442 and the first support rail 441. Similarly, the second packing table rail (not shown) and the second support rail (not shown) are connected to each other, and one or more balls for reducing friction are disposed between the second packing table rail (not shown) and the second support rail (not shown). With this configuration, the mounting table 40 moves in the X-axis direction when pressed by the store clerk or the like. Thus, the store clerk can move the mounting table 40 to any position.

Instead of balls, bearings may be disposed between the first packing table rail 442 and the first support rail 441 and between the second packing table rail (not shown) and the second support rail (not shown), Furthermore, each of the first moving mechanism 44 and the second moving mechanism (not shown) is not limited to a two-section slide rail and may be a slide rail with three or more sections. Furthermore, the first moving mechanism 44 and the second moving mechanism (not shown) are not limited to slide rails. The first moving mechanism 44 and the second moving mechanism (not shown) may be casters disposed on the bottom surfaces of the first support 41*a* and the second support 42*a*, or may be any other mechanisms.

Second Variation

Figure 5:
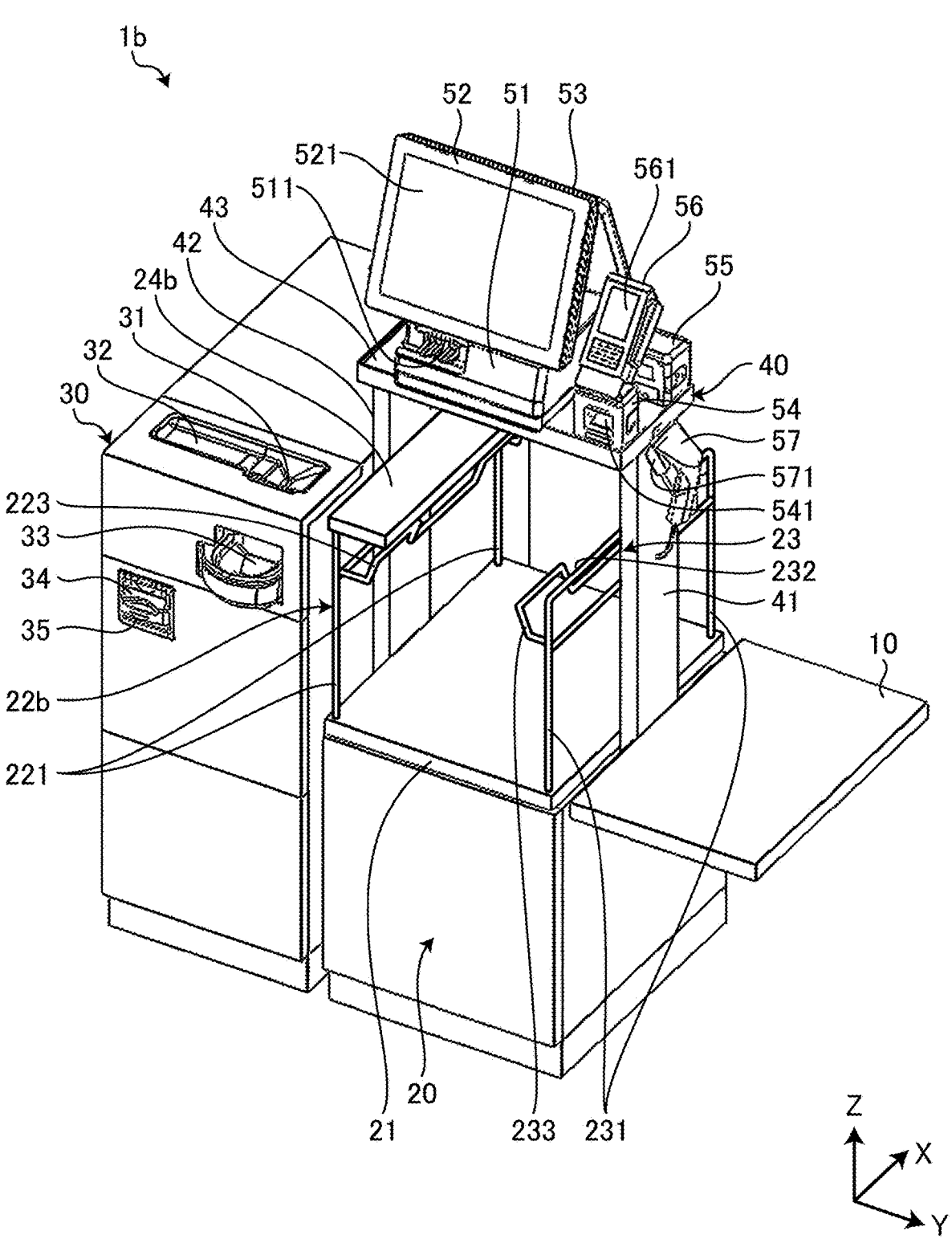
FIG. 5 is an external perspective view of a POS terminal according to a second variation.
Figure 6:
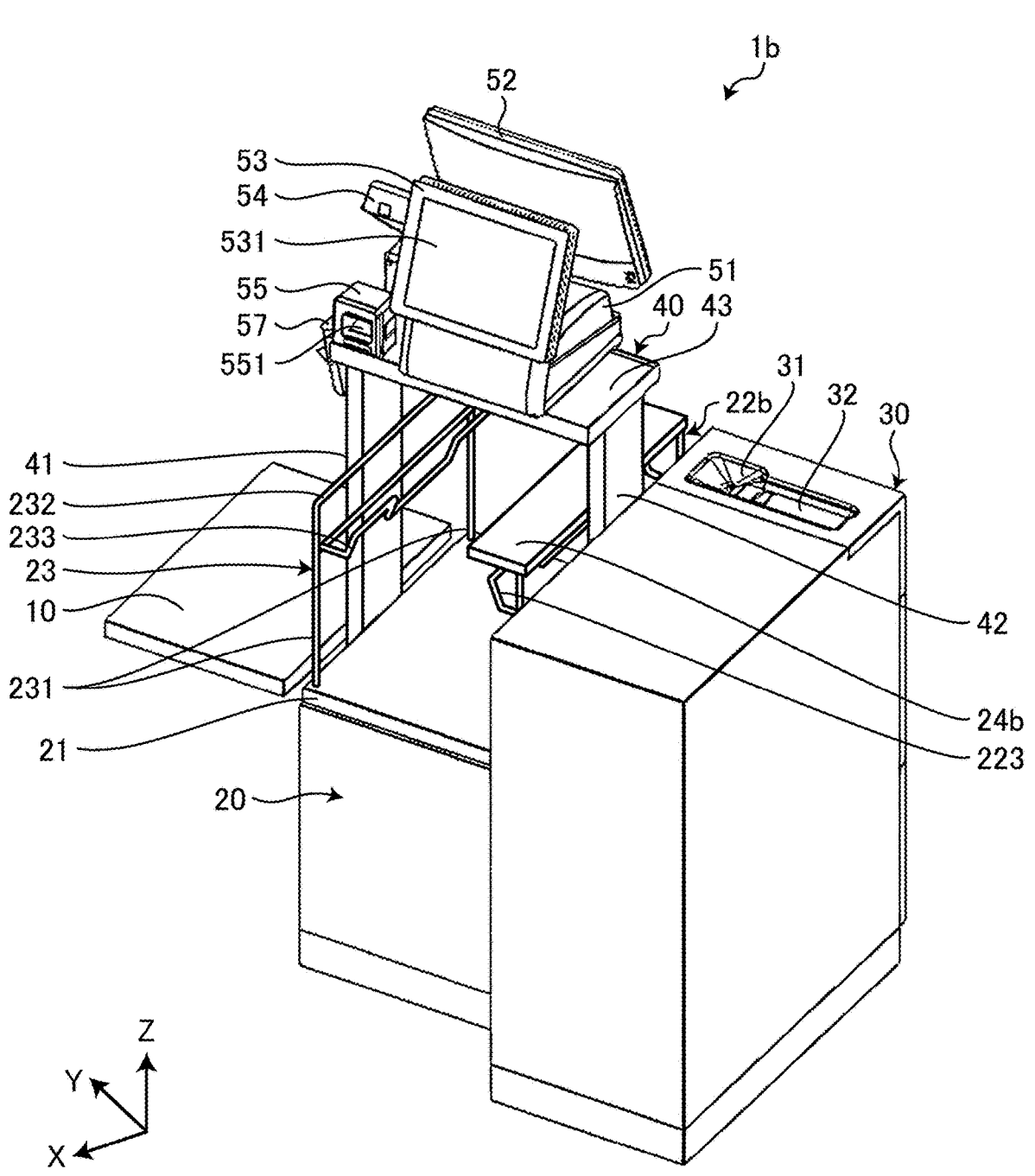
FIG. 6 is an external perspective view of the POS terminal according to the second variation.

A POS terminal 1*b* according to a second variation includes a temporary table 24*b* supported by a first bag hanger 22*b*. FIG. 5 is an external perspective view of the POS terminal 1*b* according to the second variation. FIG. 6 is an external perspective view of the POS terminal 1*b* according to the second variation.

The temporary table 24 shown in FIG. 1 is supported by the first bag hanger 22 and the second bag hanger 23 and is disposed on the store clerk side. Since the near side of the packing table 20 is covered by the temporary table 24, it is difficult for the store clerk to hang bags on the first bag hanger 22*b* and the second bag hanger 23. In addition, since the near side of the packing table 20 is covered by the temporary table 24, it may be difficult for the store clerk to put items in a bag.

Therefore, the temporary table 24*b* is supported by the first bag hanger 22*b*. The temporary table 24*b* is a rectangular plate that is long in the X-axis direction. More specifically, the first bag hanger 22*b* includes a support table 224 (see FIG. 7) attached to the horizontal bar 222. The support table 224 is a plate-shaped member that supports the temporary table 24*b* substantially parallel to the top plate 21. In other words, the support table 224 supports the temporary table 24*b* horizontally. The support table 224 is not limited to a plate-shaped member and may be a rod-shaped member or a member with any other shape.

Figure 7:
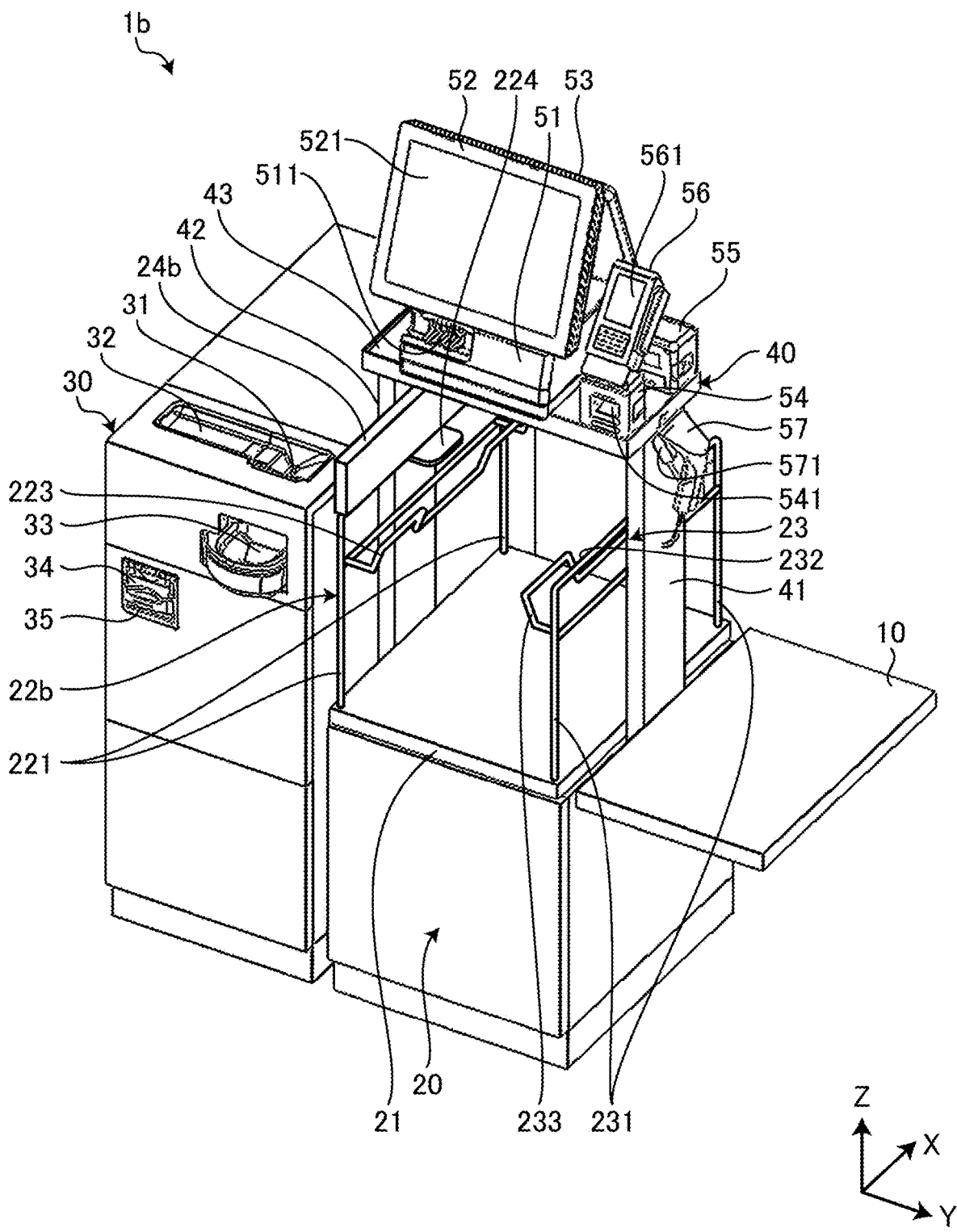
FIG. 7 is an external perspective view of the POS terminal according to the second variation with a temporary table placed in the vertical position.
Figure 8:
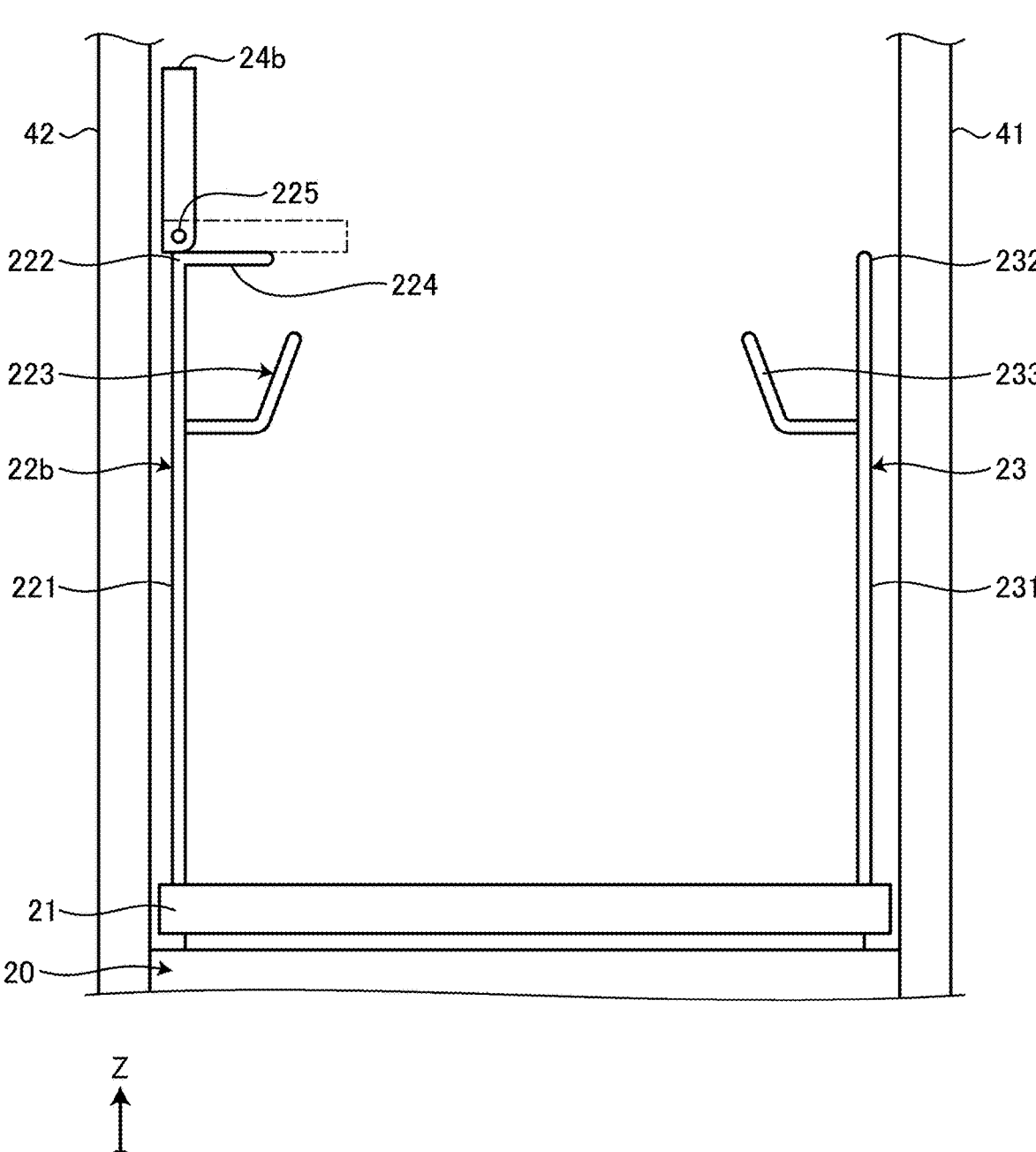
FIG. 8 is an external front view of a first bag hanger according to the second variation.

Furthermore, the temporary table 24*b* may be configured to rotate about a rotational axis that is substantially parallel to the horizontal bar 222. For example, the temporary table 24*b* may be configured to rotate about 90 degrees to a substantially vertical position. FIG. 7 is an external perspective view of the POS terminal 1*b* according to the second variation with the temporary table 24*b* in the substantially vertical position. FIG. 8 is an external front view of the first bag hanger 22*b* according to the second variation.

The temporary table 24*b* is connected to the horizontal bar 222 by a hinge 225 having a rotational axis substantially parallel to the horizontal bar 222. The temporary table 24*b* is rotated about the hinge 225 to a substantially vertical position. With this configuration, the customer and the store clerk can move the temporary table 24*b* to the substantially vertical or horizontal position according to working conditions. Therefore, the first bag hanger 22*b* can improve convenience depending on working conditions. More specifically, the customer can easily hang a bag by moving the temporary table 24*b* to the substantially vertical position. In addition, the customer can move the temporary table 24*b* to the horizontal position after hanging a bag so that the temporary table 24*b* temporarily functions as a table on which an item is placed.

If the temporary table 24*b* is not rotatable, the hook 223 of the first bag hanger 22*b* is hidden by the temporary table 24*b*. Furthermore, if the hook 223 is extended inward so as not to be hidden, the distance between the hook 223 of the first bag hanger 22*b* and the hook 233 of the second bag hanger 23 becomes small, and it becomes difficult for the customer to sufficiently open a bag and put items in the bag. When the POS terminal 1*b* is configured such that the hook 223 is not hidden and a sufficient distance is provided between the hook 223 of the first bag hanger 22*b* and the hook 233 of the second bag hanger 23, the width of the packing table 20 in the Y-axis direction increases. With the temporary table 24*b* configured to be rotatable, it is possible to provide both the convenience of bag hangers and the convenience of a temporary table while saving space.

Third Variation

Figure 9:
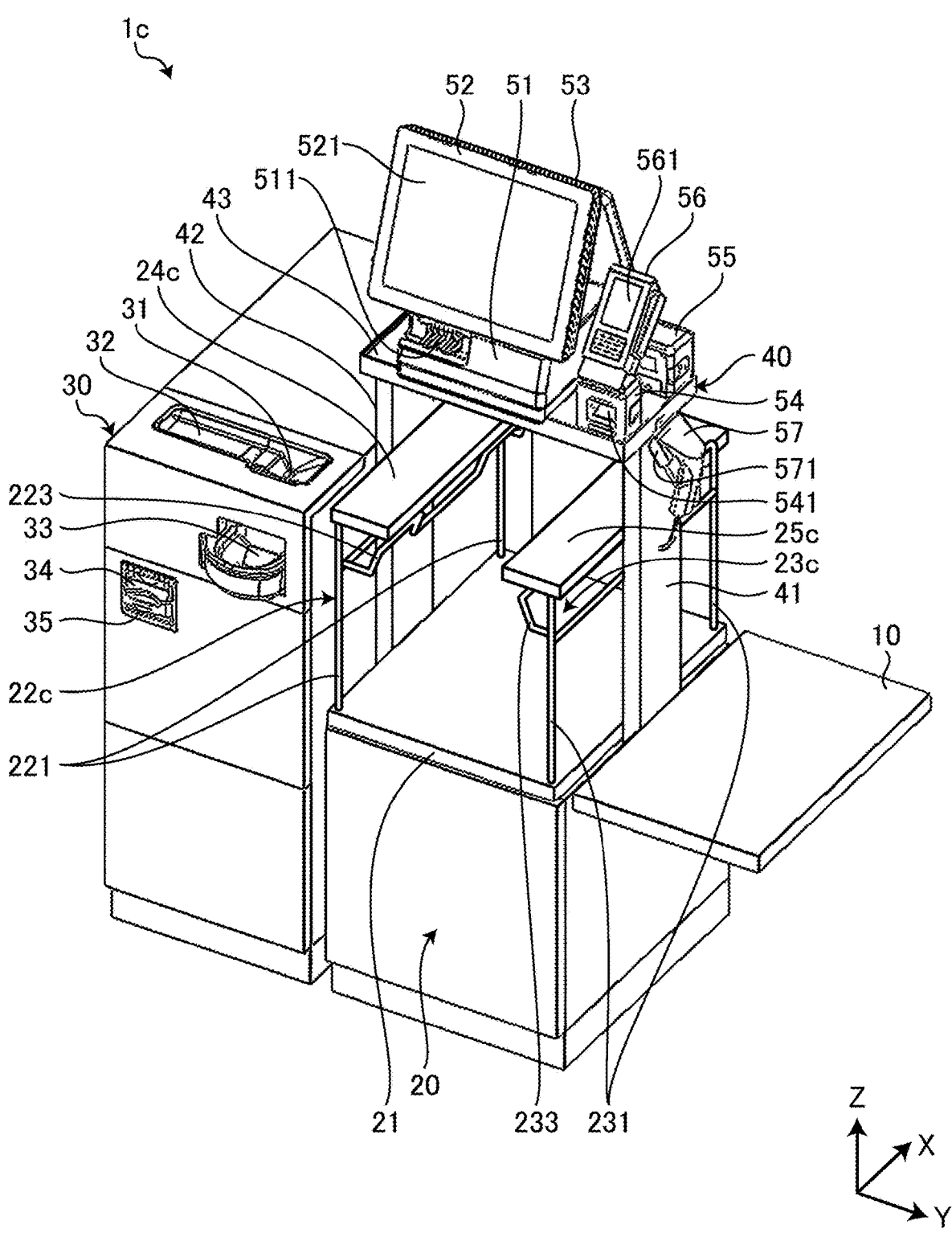
FIG. 9 is an external perspective view of a POS terminal according to a third variation.
Figure 10:
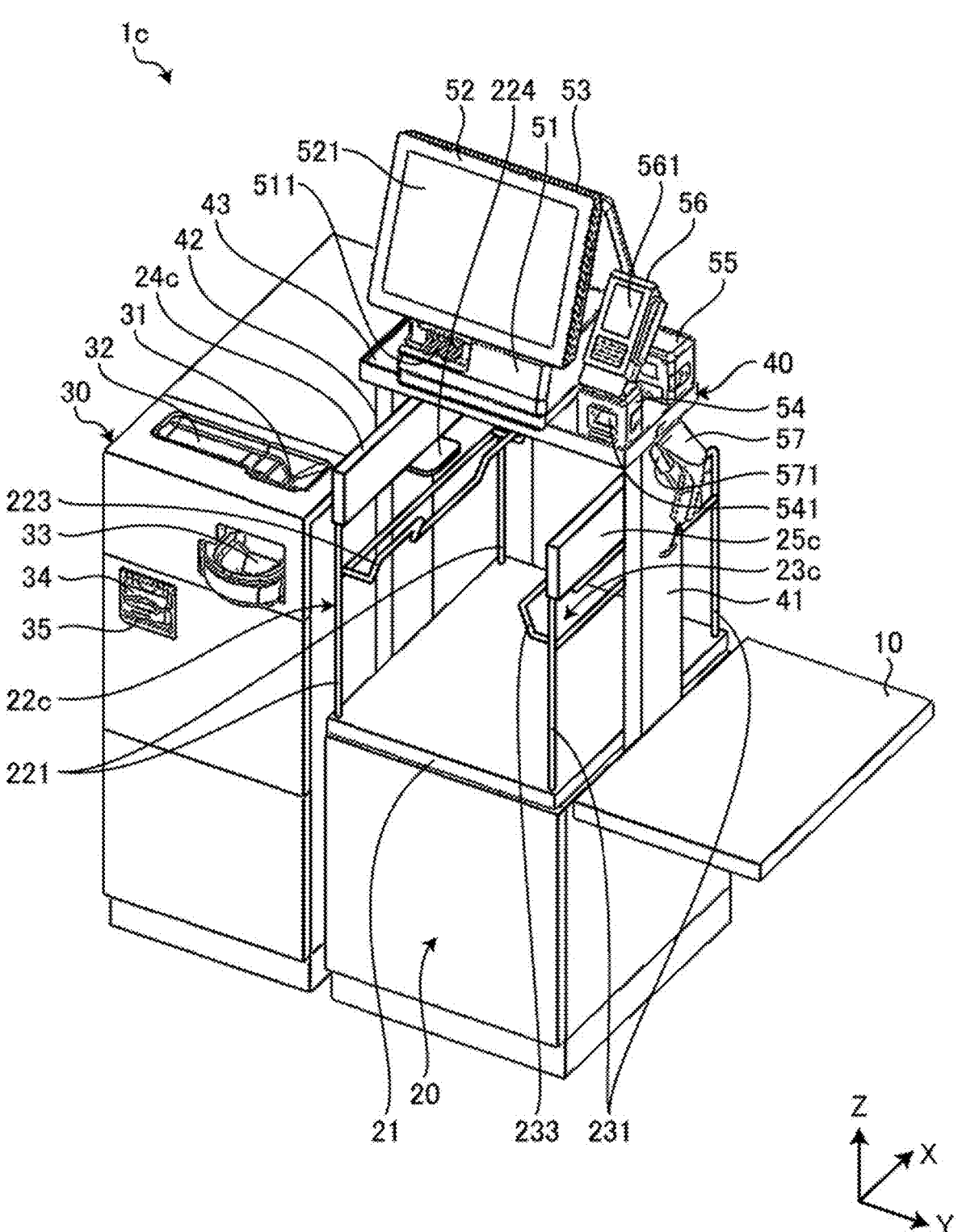
FIG. 10 is a perspective view of the POS terminal according to the third variation with a first temporary table and a second temporary table placed in the vertical positions.

A POS terminal 1*c* according to a third variation includes a first temporary table 24*c* and a second temporary table 25*c*. FIG. 9 is an external perspective view of the POS terminal 1*c* according to the third variation. FIG. 10 is a perspective view of the POS terminal 1*c* according to the third variation in which the first temporary table 24*c* and the second temporary table 25*c* are in vertical positions. The first temporary table 24*c* and the second temporary table 25*c* are examples of a second table and a third table, respectively.

As in the second variation, a first bag hanger 22*c* supports a rectangular first temporary table 24*c* that is long in the X-axis direction. Furthermore, a second bag hanger 23*c* supports a rectangular second temporary table 25*c* that is long in the X-axis direction.

Similarly to the second variation, the first bag hanger 22*c* includes the support table 224 attached to the horizontal bar 222. The support table 224 is a plate-shaped member that supports the first temporary table 24*c* substantially parallel to the top plate 21. In other words, the support table 224 is a member that supports the first temporary table 24*c* horizontally. The support table 224 is not limited to a plate-shaped member and may be a rod-shaped member or a member having any other shape. In addition, the second bag hanger 23*c* includes a support table (not shown) similarly to the first bag hanger 22*c*.

In addition, as in the second variation, the first temporary table 24*c* may be configured to rotate about a rotational axis that is substantially parallel to the horizontal bar 222. For example, the first temporary table 24*c* may be rotated about 90 degrees to a substantially vertical position.

Similarly, the second temporary table 25*c* may be configured to rotate about a rotational axis that is substantially parallel to the horizontal bar 232. For example, the second temporary table 25*c* may be rotated about 90 degrees to a substantially vertical position.

For example, the first temporary table 24*c* is connected to the horizontal bar 222 by a hinge (not shown) having a rotational axis substantially parallel to the horizontal bar 222. The first temporary table 24*c* is rotated about the hinge (not shown) to the substantially vertical position.

Similarly, the second temporary table 25*c* is connected to the horizontal bar 232 by a hinge (not shown) having a rotational axis substantially parallel to the horizontal bar 232. The second temporary table 25*c* is rotated about the hinge (not shown) to the substantially vertical position.

As described above, the POS terminal 1*c* includes the first temporary table 24*c* and the second temporary table 25*c*. With this configuration, the customer and the store clerk can place more items on the first temporary table 24*c* and the second temporary table 25*c*.

Furthermore, the customer and the store clerk can secure more workspace by rotating the first temporary table 24*c* and the second temporary table 25*c* to the substantially vertical positions.

Fourth Variation

Figure 11:
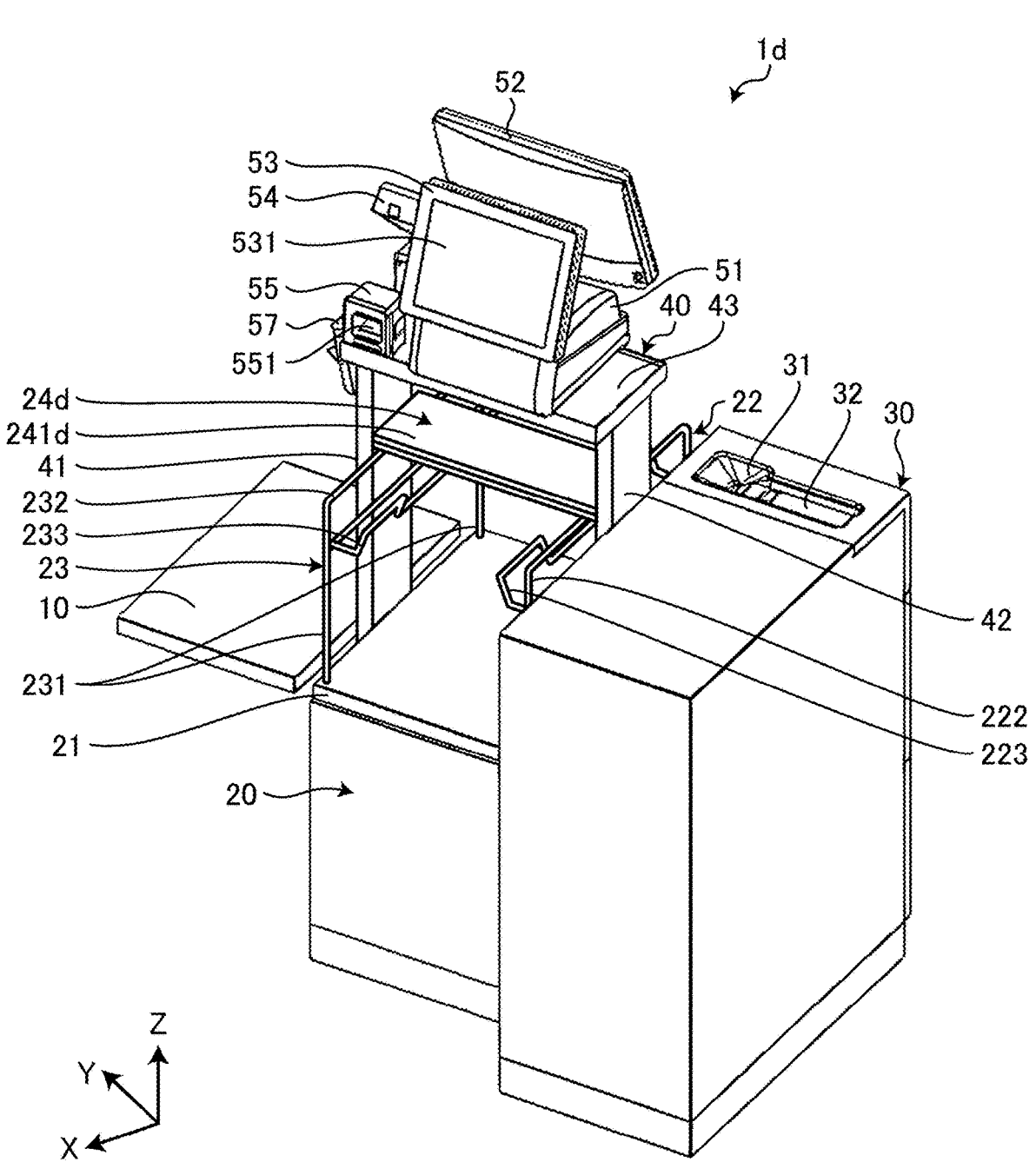
FIG. 11 is an external perspective view of a POS terminal according to a fourth variation.
Figure 12:
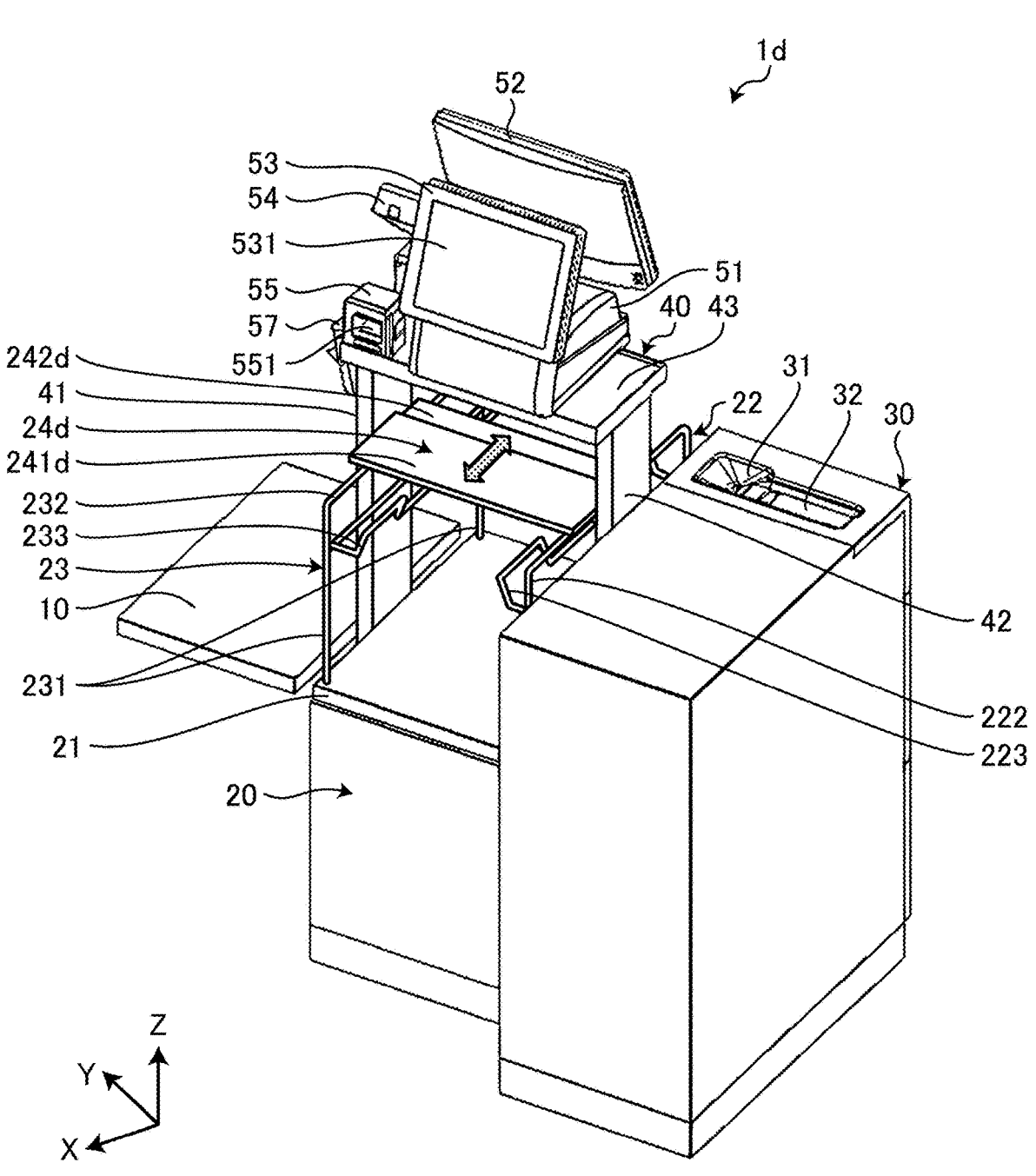
FIG. 12 is a perspective view of the POS terminal according to the fourth variation with a temporary table expanded.

A POS terminal 1*d* according to a fourth variation includes a temporary table 24*d* that can be expanded in the X-axis direction. FIG. 11 is an external perspective view of the POS terminal 1*d* according to the fourth variation. FIG. 12 is a perspective view of the POS terminal 1*d* according to the fourth variation with the temporary table 24*d* expanded.

The temporary table 24*d* can be expanded from the state shown in FIG. 11 to the state shown in FIG. 12. That is, the area of the temporary table 24*d* on which items are to be placed can be increased. The customer and the store clerk can place items on the temporary table 24*d*.

Figure 13:
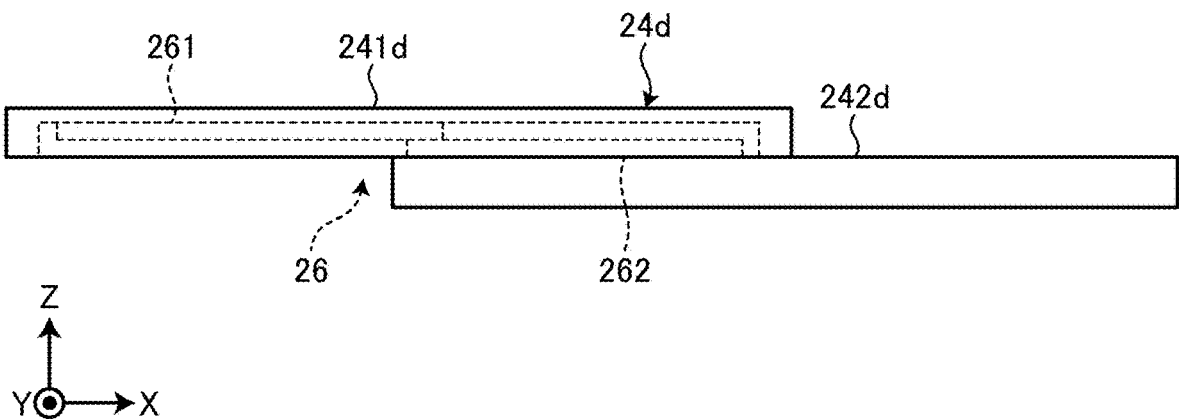
FIG. 13 is a side view of the temporary table according to the fourth variation.

FIG. 13 is a side view of the temporary table 24*d* according to the fourth variation. The temporary table 24*d* includes an upper table 241*d* and a lower table 242*d* that are stacked on each other. The lower table 242*d* is a plate-shaped member disposed below the upper table 241*d*. The lower table 242*d* is fixed to the first bag hanger 22 and the second bag hanger 23. The upper table 241*d* is a plate-shaped member disposed above the lower table 242*d*. The upper table 241*d* is an example of a first plate. The lower table 242*d* is an example of a second plate.

Furthermore, the temporary table 24*d* includes a slide mechanism 26 that is disposed between the upper table 241*d* and the lower table 242*d* and enables the upper table 241*d* and the lower table 242*d* to slide relative to each other. The slide mechanism 26 includes an upper rail 261 and a lower rail 262. The upper rail 261 and the lower rail 262 are implemented by, for example, slide rails. The upper rail 261 is fixed to the upper table 241*d*. The lower rail 262 is fixed to the lower table 242*d*.

With the above configuration, the upper table 241*d* slides in the X-axis direction when pulled in the X-axis direction by the store clerk or the like. Thus, the area of the temporary table 24*d* on which items are to be placed can be increased. In other words, the area of the temporary table 24*d* is expandable by sliding the upper table 241*d* and the lower table 242*d* relative to each other. The upper table 241*d* also slides in the X-axis direction when pushed in the X-axis direction by the store clerk or the like. Accordingly, the area of the temporary table 24*d* on which items are to be placed can be reduced. Thus, the store clerk can change the size of the temporary table 24*d* as necessary.

Fifth Variation

Figure 14:
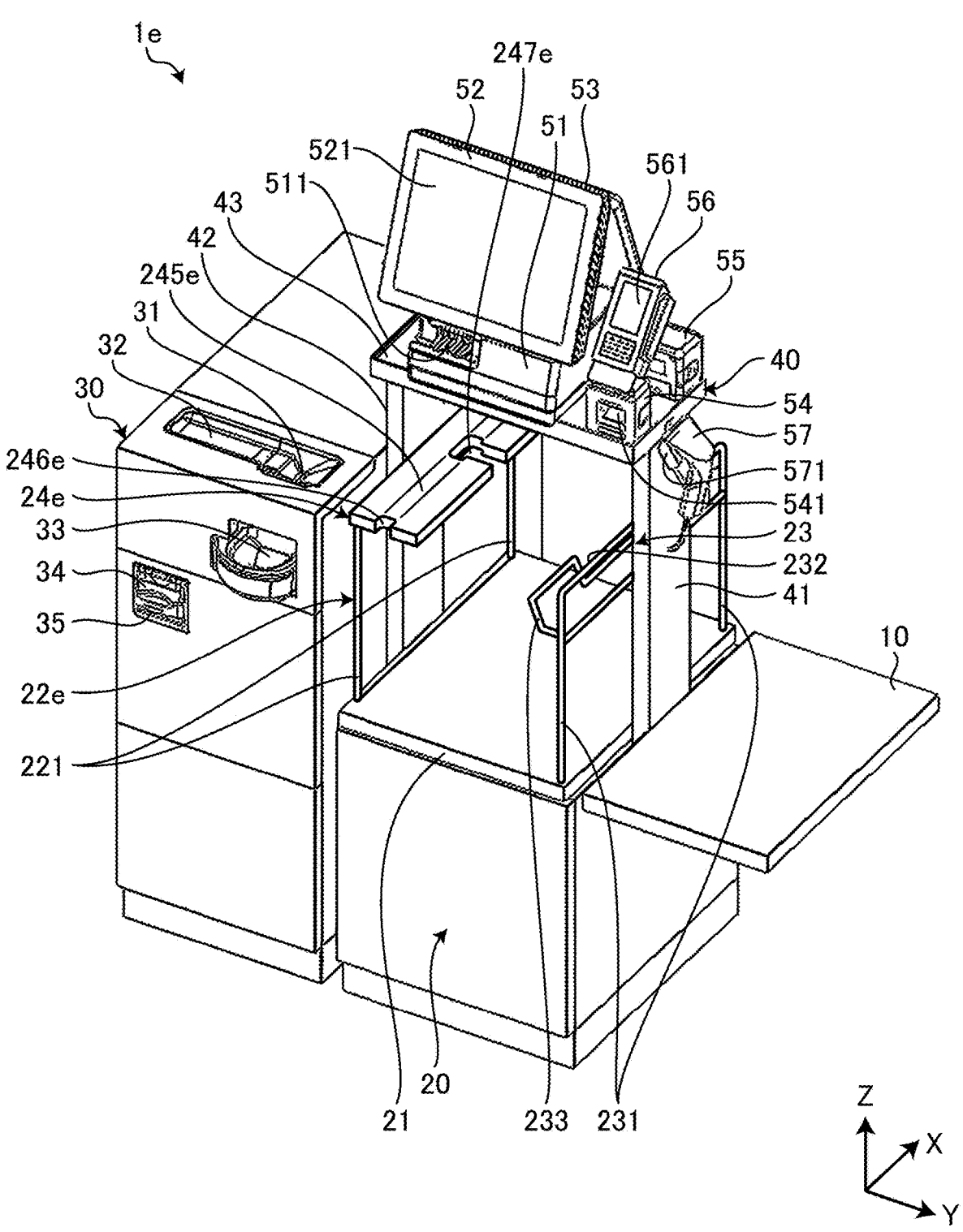
FIG. 14 is an external perspective view of a POS terminal according to a fifth variation.
Figure 15:
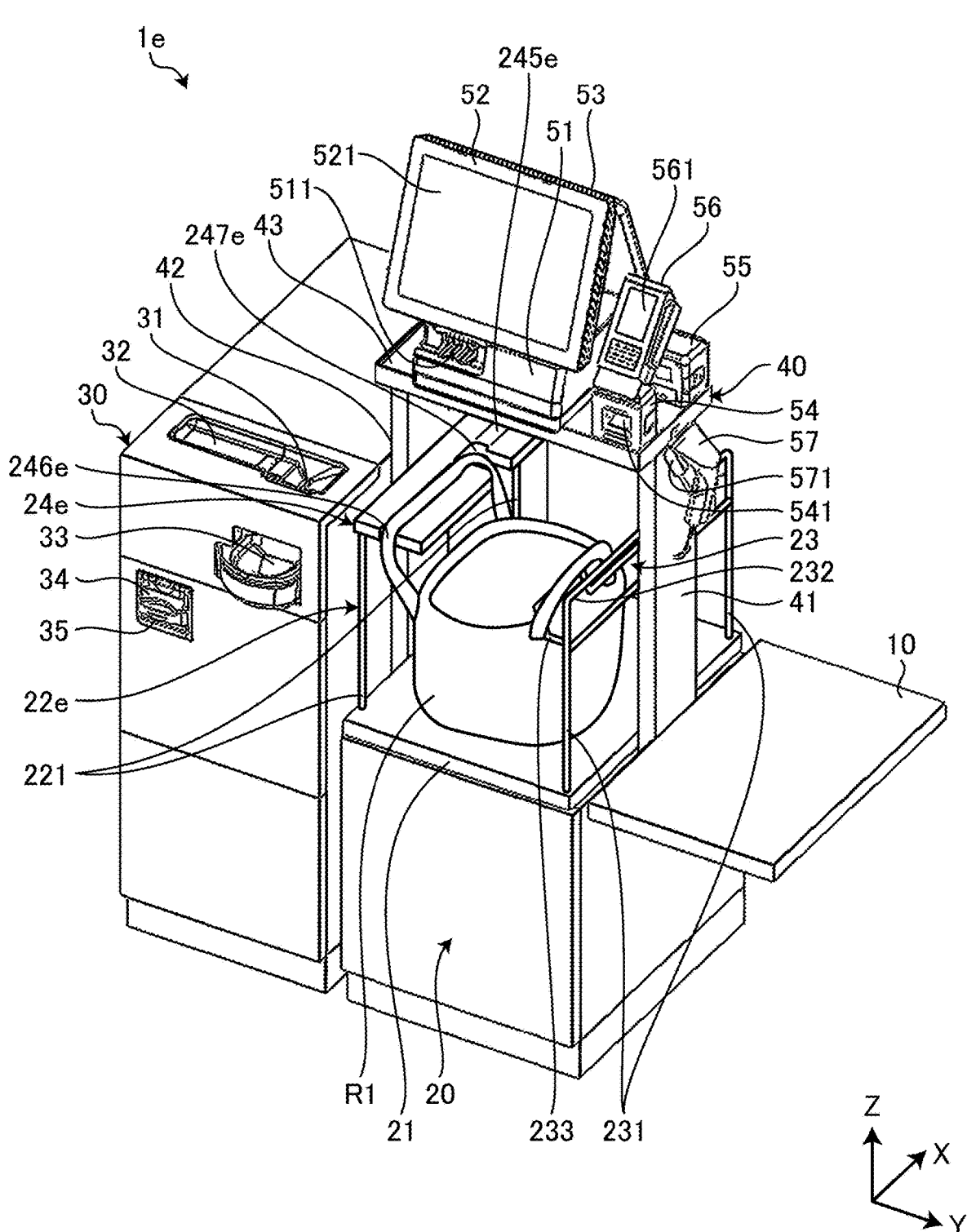
FIG. 15 is a perspective view of the POS terminal according to the fifth variation with a bag hung on a temporary table.
Figure 16:
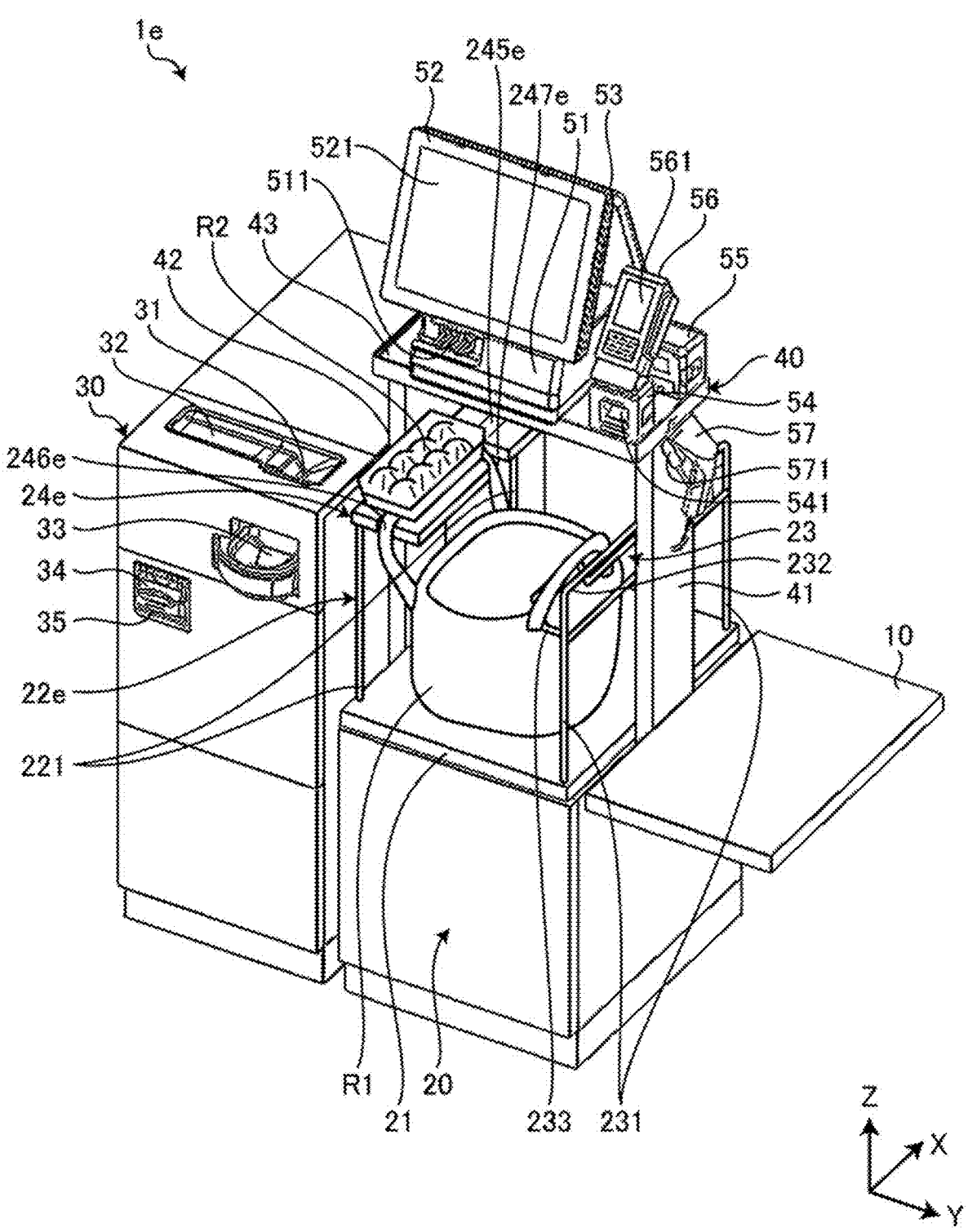
FIG. 16 is a perspective view of the POS terminal according to the fifth variation with a bag hung on the temporary table and an item placed on the temporary table.
Figure 17:
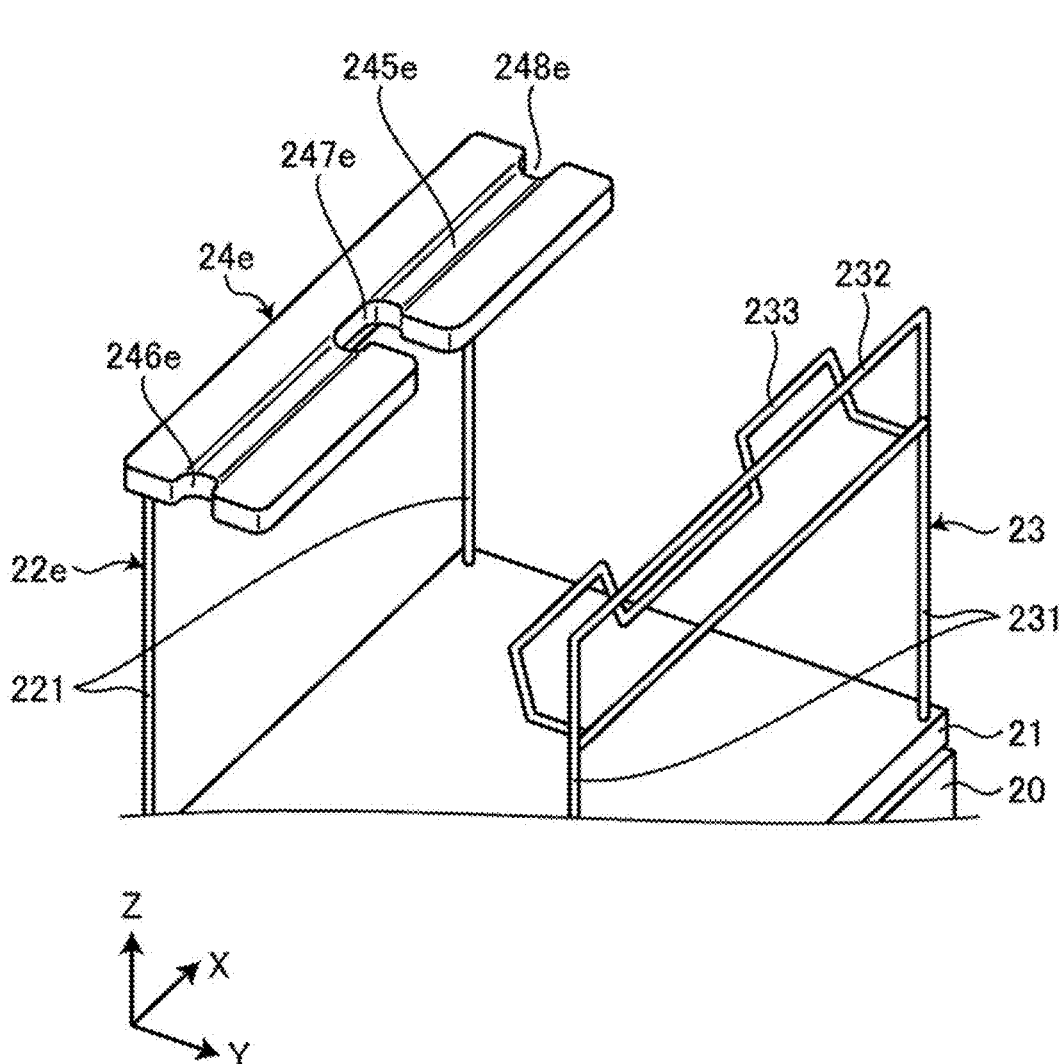
FIG. 17 is an external perspective view of the temporary table of the POS terminal according to the fifth variation.

A POS terminal 1*e* according to a fifth variation includes a temporary table 24*e* on which a bag R1 can be hung. FIG. 14 is an external perspective view of the POS terminal 1*e* according to the fifth variation. FIG. 15 is a perspective view of the POS terminal 1*e* according to the fifth variation with the bag R1 hung on the temporary table 24*e*. FIG. 16 is a perspective view of the POS terminal 1*e* according to the fifth variation with an item R2 placed on the temporary table 24*e* and the bag R1 hung on the temporary table 24*e*. FIG. 17 is an external perspective view of the temporary table 24*e* of the POS terminal 1*e* according to the fifth variation.

The POS terminal 1*e* includes the temporary table 24*e* that is supported by a first bag hanger 22*e* as in the second variation. The temporary table 24*e* has protrusions and indentations such that the bag R1 can be hung on the temporary table 24. More specifically, the temporary table 24*e* has a groove 245*e*, a first recess 246*e*, a second recess 247*e*, and a third recess 248*e* in which the bag R1 can be hung.

The first recess 246*e* is formed in a side surface of the temporary table 24*e* on the customer side. The second recess 247*e* is formed in a side surface of the temporary table 24*e* facing the second bag hanger 23 at a position that is substantially in the middle of the temporary table 24*e* in the X-axis direction. The third recess 248*e* is formed in a side surface of the temporary table 24*e* on the store clerk side. The groove 245*e* is formed substantially in the middle of the temporary table 24*e* and extends substantially parallel to the longitudinal direction of the temporary table 24*e*.

As shown in FIG. 15, the customer or the store clerk hangs the bag R1 in any one of the first recess 246*e*, the second recess 247*e*, and the third recess 248*e*. With this configuration, the temporary table 24*e* can keep the bag R1 open.

In addition, the customer or the store clerk can place a handle of the bag R1 in the groove 245*e* of the temporary table 24*e*. In this case, as shown in FIG. 16, the item R2 can be stably placed on the temporary table 24*e* even when the bag R1 is hung on the temporary table 24*e*.

The POS terminals 1, 1*a*, 1*b*, 1*c*, 1*d*, and 1*e* are examples of sales data processing apparatuses of this disclosure.

The POS terminals 1, 1*a*, 1*b*, 1*c*, 1*d*, and 1*e* can be used in the following modes. For example, the POS terminals 1, 1*a*, 1*b*, 1*c*, 1*d*, and 1*e* can be switched to a normal mode. In the normal mode, the store clerk performs the item registration process and the payment process for items registered in the item registration process. In this mode, the store clerk stands on the customer side shown in FIG. 1 and operates the POS terminal 1, 1*a*, 1*b*, 1*c*, 1*d*, or 1*e*.

For example, the POS terminals 1, 1*a*, 1*b*, 1*c*, 1*d*, and 1*e* can be switched to a customer payment mode. In the customer payment mode, the store clerk performs the item registration process, and the customer performs the payment process for items registered in the item registration process. In this mode, the customer stands on the customer side shown in FIG. 1, and the store clerk stands on the store clerk side shown in FIG. 2. Then, the store clerk performs the item registration process by operating the second reading unit 55, and the customer performs the payment process by operating the automatic change machine 30 and the payment terminal 56. The POS terminals 1, 1*a*, 1*b*, 1*c*, 1*d*, and 1*e* can achieve the above-described advantageous effects even in these modes.

In addition, the POS terminals 1, 1*a*, 1*b*, 1*c*, 1*d*, and 1*e* can operate in one or more of the self-service mode, the face-to-face mode, the normal mode, and the customer payment mode. Furthermore, the POS terminals 1, 1*a*, 1*b*, 1*c*, 1*d*, and 1*e* do not necessarily support all of the self-service mode, the face-to-face mode, the normal mode, and the customer payment mode. That is, the POS terminals 1, 1*a*, 1*b*, 1*c*, 1*d*, and 1*e* may support one or more of the self-service mode, the face-to-face mode, the normal mode, and the customer payment mode.

While certain embodiments have been described, the embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

Programs executed by each device in the above-described embodiments or variations may be installed in advance in a storage medium (e.g., a ROM or a storage unit) included in the device. However, the present invention is not limited to this example. As another example, programs may be recorded in a computer-readable storage medium, such as a CD-ROM, a flexible disk (FD), a CD-R, or a digital versatile disk (DVD) in installable formats or executable formats. Furthermore, the storage medium is not limited to a medium that is independent of a computer or an embedded system, and may be a storage medium in which programs downloaded via a LAN, the Internet, or the like are stored or temporarily stored.

Furthermore, programs executed by each device in the above-described embodiments or variations may be stored in a computer connected to a network such as the Internet, and the programs may be downloaded via the network or may be provided or distributed via a network such as the Internet.

What is claimed is:

1. A sales data processing apparatus comprising:
   a first table on which an item is placeable;
   a mounting table including a mounting plate and columnar supports sandwiching the first table and on which the mounting plate is disposed above the first table;
   a first display device that is disposed on the mounting plate and includes a display surface facing a first direction;
   a first reading device configured to read a symbol on an item, disposed on the mounting plate adjacent to the first display device, and facing the first direction;
   a second display device that is disposed on the mounting plate and includes a display surface facing a second direction opposite to the first direction;
   a second reading device configured to read a symbol on an item, disposed on the mounting plate adjacent to the second display device, and facing the second direction; and
   a moving mechanism that enables the columnar supports to move in the first direction and the second direction with respect to the first table.

2. The sales data processing apparatus according to claim 1, further comprising:
   at least one bag hanger on which a bag is hangable, the at least one bag hanger including vertical bars extending substantially perpendicularly from the first table and a horizontal bar supported by the vertical bars; and
   a second table supported by the bag hanger between the first table and the mounting plate of the mounting table.

3. The sales data processing apparatus according to claim 2, wherein
   the at least one bag hanger comprises multiple bag hangers, and
   the second table is supported by the multiple bag hangers.

4. The sales data processing apparatus according to claim 2, wherein
   the second table is rotatable about a rotational axis to a substantially vertical position, the rotational axis being substantially parallel to the first direction.

5. The sales data processing apparatus according to claim 2, wherein the second table includes a first plate and a second plate that are stacked and slidable relative to each other.

6. The sales data processing apparatus according to claim 2, wherein the second table has a groove along which a handle of a bag can be placed.

7. The sales data processing apparatus according to claim 6, wherein
   the second table has a recess at an end of the groove through which the handle of the bag passes.

8. The sales data processing apparatus according to claim 2, wherein
   the at least one bag hanger includes a support table that supports the second table substantially parallel to the first table.

9. The sales data processing apparatus according to claim 2, further comprising:
   a third table facing the second table between the first table and the mounting plate of the mounting table, wherein
   the at least one bag hanger comprises a first bag hanger that supports the second table and a second bag hanger that supports the third table.

10. The sales data processing apparatus according to claim 2, wherein the at least one bag hanger further includes a hook that is supported by the vertical bars and on which the bag is hangable.

11. The sales data processing apparatus according to claim 2, wherein
    the first table includes a top plate, and
    the vertical bars are disposed in corners of the top plate and arranged along the first direction.

12. The sales data processing apparatus according to claim 1, wherein
    upon receiving a switching operation, the sales data processing apparatus switches from a first mode in which a customer performs both an item registration process for registering an item for purchase and a payment process of making a payment for the registered item, to a second mode in which both the customer and a store clerk can perform the item registration process and the customer performs the payment process.

13. The sales data processing apparatus according to claim 12, wherein
    the sales data processing apparatus is switchable to: a third mode in which the store clerk performs the item registration process and the payment process, and a fourth mode in which the store clerk performs the item registration process and the customer performs the payment process.

14. The sales data processing apparatus according to claim 1, further comprising:
    a side table on which an item is placeable; and
    an automatic change machine facing the first direction, wherein
    the side table and the automatic change machine are arranged to face each other across the first table, and
    one of the columnar supports extends between the first table and the side table, and another of the columnar supports extends between the first table and the automatic change machine.

15. The sales data processing apparatus according to claim 1, further comprising:
    a handy scanner that is disposed on a side of the mounting table in a direction orthogonal to the first direction.

16. The sales data processing apparatus according to claim 1, wherein
    each of the columnar supports has a plate shape and extends along the first direction and a vertical direction perpendicular to the first direction.

17. The sales data processing apparatus according to claim 1, wherein
    the first table includes a top plate and a weight scale for measuring a weight of an item placed on the top plate.

18. The sales data processing apparatus according to claim 17, further comprising:
    a processor configured to compare the weight of the item measured by the weight scale with a weight of the item registered in an item master.

19. The sales data processing apparatus according to claim 1, further comprising:
    at least one bag hanger on which a bag is hangable, the at least one bag hanger including vertical bars extending substantially perpendicularly from the first table and a horizontal bar supported by the vertical bars;
    a second table supported by the bag hanger between the first table and the mounting plate of the mounting table; and
    a moving mechanism that enables the supports to move in the first direction and the second direction.

* * * * *